(12) United States Patent
Giefer et al.

(10) Patent No.: US 7,661,334 B2
(45) Date of Patent: Feb. 16, 2010

(54) LOCKING DEVICE

(75) Inventors: Andreas Giefer, Lemförde (DE); Jörg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 556 days.

(21) Appl. No.: 10/566,125

(22) PCT Filed: Sep. 23, 2004

(86) PCT No.: PCT/DE2004/002116

§ 371 (c)(1), (2), (4) Date: Jan. 25, 2006

(87) PCT Pub. No.: WO2005/031491

PCT Pub. Date: Apr. 7, 2005

(65) Prior Publication Data

US 2006/0185467 A1    Aug. 24, 2006

(30) Foreign Application Priority Data

Sep. 23, 2003    (DE) ................................. 103 44 287

(51) Int. Cl.
*G05G 1/04* (2006.01)
(52) U.S. Cl. ....................................................... 74/523
(58) Field of Classification Search ................ 74/473.1, 74/473.3, 519, 523
See application file for complete search history.

(56) References Cited

U.S. PATENT DOCUMENTS 6,448,670 B1 *    9/2002    Onodera et al. ............ 307/10.1
7,467,569 B2 *    12/2008    Wang ...................... 74/473.21

FOREIGN PATENT DOCUMENTS

| DE | 199 25 032 | 12/2000 |
| EP | 0 943 845 | 9/1999 |
| JP | 4-34262 | 2/1992 |
| WO | WO 99/32316 | 7/1999 |
| WO | WO 02/061522 | 8/2002 |

* cited by examiner

*Primary Examiner*—Vicky A Johnson
(74) *Attorney, Agent, or Firm*—McGlew and Tuttle, P.C.

(57) ABSTRACT

A locking device (10) includes an adjustable bracket (7) provided with a recess (16), a stationary contour (9) with a contact surface (12), a pin (8), which is arranged movably in the recess (16) and on which an axial spring force generated by a compression spring (21) acts. A pin head (14) projects from the recess (16) of the bracket (7) and has a contact pair with the contact surface (12). At least one centering device (18) is provided between the pin (8) and the bracket (7). The locking device has a centering device (18), which has an elastically deformable ring (19). The ring (19) is arranged between the pin (8) and the bracket (7) within the recess (16) and is displaceably arranged within the recess (16). The ring (19) has a surface (22) with a cross section tapering against the direction of the force of the compression spring (21). The surface is in contact with a complementary surface (23) at the pin (8).

10 Claims, 8 Drawing Sheets

LOCKING DEVICE

CROSS REFERENCE TO RELATED APPLICATIONS

This application is a United States National Phase application of International Application PCT/DE 2004/002116 filed Sep. 23, 2004 and claims the benefit of priority under 35 U.S.C. § 119 of German Application DE 103 44 287.1 filed Sep. 23, 2003, the entire contents of which are incorporated herein by reference.

FIELD OF THE INVENTION

The present invention pertains to a locking device with an adjustable bracket, in which a recess is provided for a pin on which a spring force acts. The head of the pin projects from the recess and is in contact with a contact surface at a stationary contour.

BACKGROUND OF THE INVENTION

Such locking devices are used, for example, in shifting devices for actuating transmissions in motor vehicles in order to indicate the shift positions selected by the driver by means of a gearshift lever. The gearshift lever is fixed in the shift positions by means of a locking device in relation to a gearshift housing and it indicates to the driver that a desired shift position has been reached. Due to tolerances related to the design and manufacture, the mounting of the movable parts of the locking devices, especially a locking pin, has a clearance, which leads to an inaccurate and fuzzy indication of the shift position by the gearshift lever. Furthermore, this clearance may lead to an undesired noise generation during travel. Centering devices are used to avoid the clearance between the locking pin and its mount.

Such a centering device is disclosed in WO 02/061 522, where an elongated sleeve, which surrounds the pin for the locking mechanism and is in functional connection with the bracket, is used for centering. The pin and the sleeve are arranged in a recess of the bracket and are in connection with one another via a compression spring. The sleeve is slotted in parallel to its longitudinal axis toward the head of the pin and thus forms a plurality of tongue-like and flexible sections. In the area of the opening of the recess, the sleeve has, furthermore, a conical area, which is in contact with a likewise conical area on the bracket. The head of the pin cooperates, in turn, with the surface of a fixed contour and locks into depressions in the surface. In case of contact between the pin and the surface of the stationary contour, the compression spring transmits a compressive force directed into the recess onto the sleeve, and the sections of the sleeve are bent over the conical areas in the direction of the central longitudinal axis. The sections of the sleeve press by a plurality of the pins and thus center the latter in relation to the central longitudinal axis.

The components that have a complicated shape and require much space for their installation are especially disadvantageous in the embodiment according to WO 02/061 522. The sleeve used, in particular, required a comparatively large diameter for the recess in the bracket as well as great depth of the recess, because the sleeve is arranged around the pin and the individual sections require a certain length in the axial direction for the necessary bending. Furthermore, clamping does not necessarily take place for the centering over the entire circumference of the pin, but in a punctiform manner only and over a relatively small pressing area, which may lead to premature wear phenomena in the form of pressure marks and furrows on the pin in the unfavorable case. Due to the only punctiform effect of the slotted sections, the pin is not absolutely centered in relation to the central longitudinal axis of the recess if the sleeve was manufactured with a defect. Furthermore, centering always takes place in the area of the opening of the recess, because the sleeve is supported here at the bracket. Moreover, it is necessary for the satisfactory function of the centering device that the sleeve be manufactured from a plastic in order to satisfactorily ensure the necessary bending of the sections. Selection from among the possible materials that can be used is thus greatly limited.

Another essential disadvantageous aspect of the embodiment according to WO 02/061 522 is the possible squeezing of the sleeve during the shifting operation or in case of abuse. The shifting forces act on the pin at right angles to the longitudinal axis thereof during the shifting operation, as a result of which the shifting forces are transmitted completely via the sleeve, especially in case of abuse, and there is a risk of damage to the sleeve.

SUMMARY OF THE INVENTION

The object of the present invention is consequently to provide a locking device with a centering device, which has a compact design, requires only a small space for its installation and contains components of a simple design. Furthermore, the centering device shall guarantee reliable and uniform centering with a uniform force distribution.

This object is accomplished according to the present invention with a locking device with a centering device provided between a pin and a bracket is characterized according to a first embodiment in that the centering device has at least one elastically deformable ring, which is arranged completely within a recess provided in a bracket between the pin and the bracket. The elastically deformable ring is arranged displaceably within the recess and has a surface with a cross section that tapers against the direction of the force of a compression spring acting axially on the pin and is in contact with a complementary surface on the pin. Under the action of the axially acting spring force, the surface of the elastically deformable ring slides on the complementary surface of the pin and the ring expands. The ring is in contact now with the inner surface of the recess and thus compensates the clearance between the pin and the recess and centers the pin in relation to the longitudinal axis of the recess.

According to a second embodiment, a centering device, which is likewise arranged between the pin and the bracket, is equipped for a locking device with two elastically deformable rings, which are likewise arranged completely within the recess between the pin and the bracket. In the direction of the longitudinal axis of the recess, both rings have a tapering surface, via which the two elastically deformable rings are in contact with one another. Under an axially acting load, for example, a spring force, the elastically deformable rings slide over their tapering surfaces, via which they are in contact with one another. One of the two rings is compressed, while the other ring expands. The clearance between the pin and the bracket is thus compensated and the pin is centered in relation to the longitudinal axis of the recess.

In a preferred embodiment, the elastically deformable rings are designed as slotted rings with at least one continuous slot, which is arranged axially or obliquely in relation to the longitudinal axis of the recess and completely or partially severs the ring. Such a locking device with a centering device is characterized by a compact design requiring little space for its installation. In particular, the radial extension as well as the axial extension of the locking device can remain limited to a minimum. Thus, the diameter of the recess needs to be only slightly larger in the first embodiment than the diameter of the pin. The compact design is facilitated by the simple design of the elastically deformable rings, especially the slotted rings, which are standard components, as a result of which additional cost savings are achieved.

In an especially advantageous embodiment, the tapering surface of the elastically deformable ring or rings has a conical shape. As a result, favorable force distribution is obtained especially for components of a radial design, especially if the spring load generated, for example, by an inserted compression spring, acts directly on the elastically deformable ring. At the other end, the compression spring is supported on the pin or the bracket. The slotted rings, in particular, slide simply over the conical surfaces and can simply expand or contract correspondingly. The load is advantageously supported and transmitted over a large area, as a result of which the pin is relieved and the risk of premature wear is avoided.

Moreover, it applies to the first embodiment that squeezing of the elastically deformable ring does not occur during a shifting operation or in case of abuse because the ring slides on the tapering, ideally conical surfaces until the external diameter of the pin is in contact with the inner wall of the recess. Since a relatively large area is in contact, overloads on the pin are very extensively avoided and nearly ruled out on the elastically deformable ring.

The use of slotted rings makes it, moreover, possible to select the material relatively freely for the combination of pin, bracket and elastically deformable ring. Thus, the slotted ring, in particular, may be manufactured from a plastic or, for example, a metallic material, for example, a spring steel, or a very hard plastic. The pin as well as the bracket are advantageously manufactured from a plastic for reasons of low weight, but it is also possible to use other materials, such as metallic materials. Furthermore, the use of elastically deformable rings makes it possible to freely select the location of the centering device within the recess, so that there are certain possibilities of variation here, for example, for the optimal determination of lever lengths.

An especially favorable centering action is obtained if two centering devices, which are located at spaced locations from one another and between which a compression spring acts, are used at the pin. One centering device is arranged now in the vicinity of the opening of the recess and the second centering device inside the recess. The pin is centered in this case at two positions in relation to the longitudinal axis of the recess and is held without clearance in the recess. Both centering devices may have the same design corresponding to the explanations given above, or different designs are combined with one another.

Some possible embodiments of the locking device according to the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
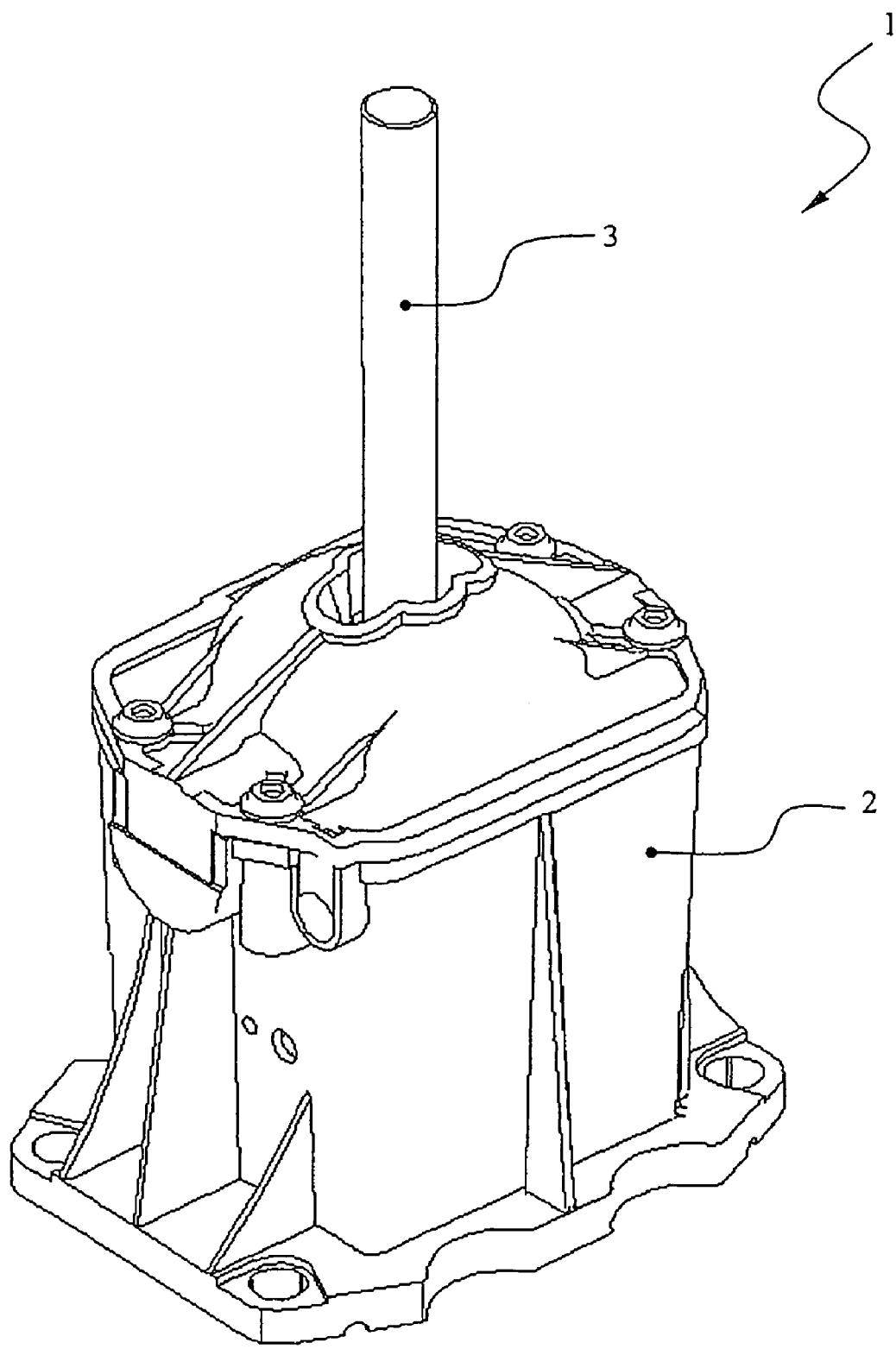
FIG. 1 is a shifting device for actuating transmissions in motor vehicles with a gearshift lever.
Figure 2:
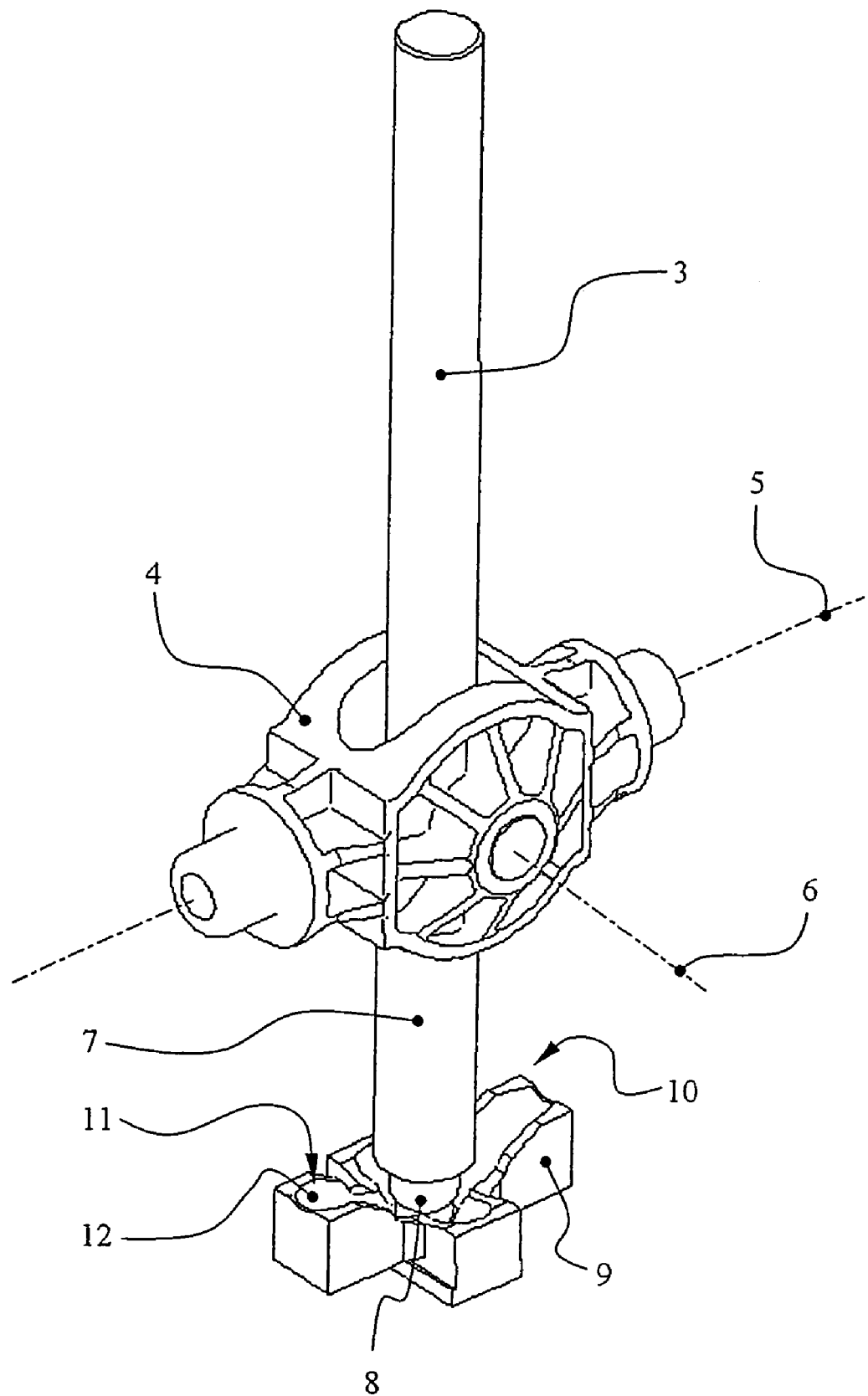
FIG. 2 is a gearshift lever according to FIG. 1 with a locking device according to the present invention.

Referring to the drawings in particular, FIGS. 1 and 2 show an exemplary embodiment of a shifting device 1 for actuating a transmission in motor vehicles. A gearshift lever 3 is mounted in a gearshift housing 2 connected rigidly to the vehicle body pivotably about a first pivot axis 5 and a second pivot axis 6 by means of a swivel joint 4. A bracket 7, which is rigidly connected to the gearshift lever 3 and has a one-part design together with the gearshift lever 3 here, in which said gearshift lever a movable pin 8 is arranged, is provided at the lower part of the gearshift lever 3, which said part is located in the gearshift housing 2. Together with a contour 9, which is rigidly connected to the gearshift housing 2, the bracket 7 and the pin 8 form the locking device 10. The contour 9 has a guide groove 11 with a contact surface 12, which is in contact with the pin 8.

Figure 3:
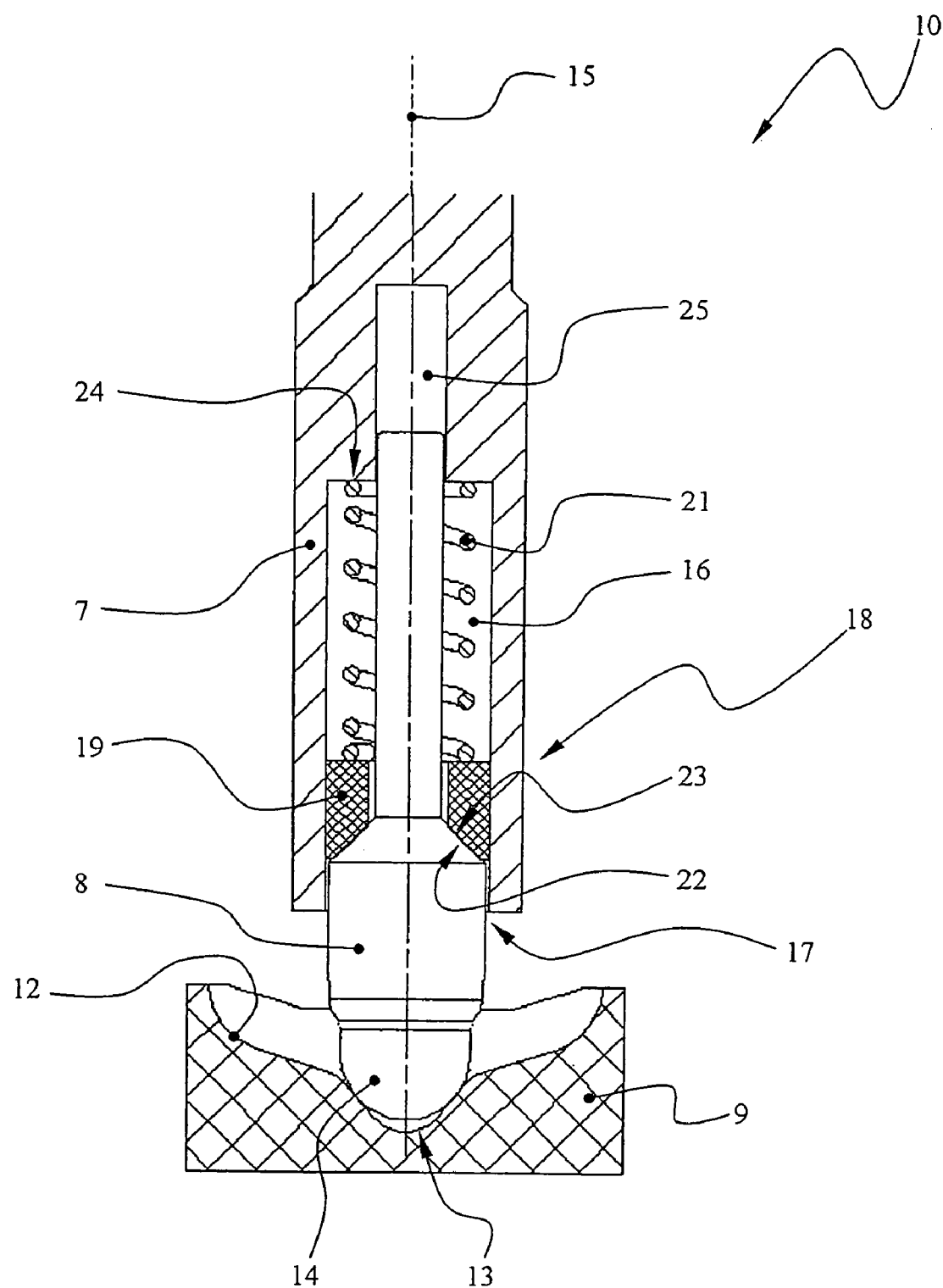
FIG. 3 is a sectional view of a detail of a first exemplary embodiment of the locking device according to the present invention.
Figure 4:
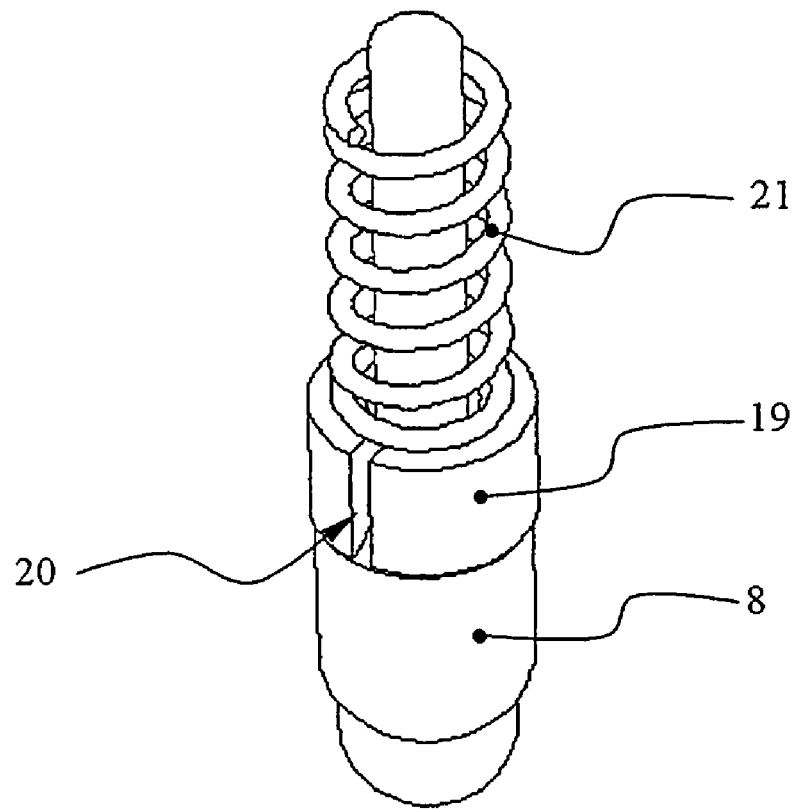
FIG. 4 is a three-dimensional view of a detail of the first exemplary embodiment according to FIG. 3 of the locking device according to the present invention.

A first exemplary embodiment of the inner design of the locking device 10 is shown in FIGS. 3 and 4. The contact surface 12, which is in contact with the pin 8, has a depression 13, in which the pin 8 is locked with its pin head 14 in the position being shown. The pin 8 is arranged displaceably along a longitudinal axis 15 of the recess 16 and has a rotationally symmetrical design. A centering device 18 is arranged within the recess 16 in the vicinity of the opening 17 of the recess 16. An elastically deformable ring, designed as a slotted ring 19, is provided for this purpose between the pin 8 and the bracket 7. The slotted ring 19 has a slot 20, which is arranged axially in relation to the longitudinal axis 15 of the recess and which completely severs the slotted ring. A compression spring 21, which loads the pin 8 with an axial spring force, is arranged between the slotted ring 19 and the bracket 7. The slotted ring has a surface 22 for this purpose, which tapers against the direction of the force of the compression spring and is in contact with the pin 8 by a complementary area. Both the tapering surface 22 and the complementary area 23 at the pin 8 are of a conical shape. The compression spring 21 is supported at a shoulder 24 of the bracket 7 on the side facing away from the slotted ring 19. The pin 8 is guided inside the recess 16 in a tapered area 25 of the recess 16.

When the pin head 14 of the pin 8 is in contact with the contact surface 12 of the contour 9, the compression spring 21 is always compressed and it loads the pin 8 via the slotted ring 19 with a force. Since this force is supported via the slotted ring 19, the conical areas 22, 23 of the slotted ring 19 and of the pin 8 slide on one another and the slotted ring expands until it comes into contact with the inner wall of the recess 16. The pin 8 is subsequently centered in relation to the longitudinal axis 15 of the recess 16 via the conical areas 22, 23. The conical areas 22, 23 make possible a uniform radial force distribution over the circumference, so that uniform and reliable centering in relation to the central longitudinal axis 15 of the recess 16 is guaranteed. Moreover, the load on the pin 8 is kept low by the relatively large force transmission surfaces of the conical areas 22, 23 in order to thus avoid pressure marks or premature wear. This arrangement has a very compact design and is small; in particular, the diameter of the recess 16 is only slightly larger than the external diameter of the pin 8. During a shifting operation or in case of abuse, when a force acting at right angles to the longitudinal axis 15 acts on the pin 8, the slotted ring 19 can yield via the conical surfaces 22, 23 in the direction of the longitudinal axis, so that the pin 8 comes into contact with the inner wall of the recess 16 and is supported here. Damage to the pin is avoided due to the relatively large area available for the force transmission. Squeezing of the slotted ring 19 is ruled out because, as was described, the slotted ring yields. Since only slight relative movements occur between the pin 8 and the slotted ring 19, the combination of the materials for the pin 8 and the slotted ring 19 can also be selected relatively freely. Furthermore, standardized components can be used, so that cost savings are additionally achieved besides the reduced design effort.

Figure 5:
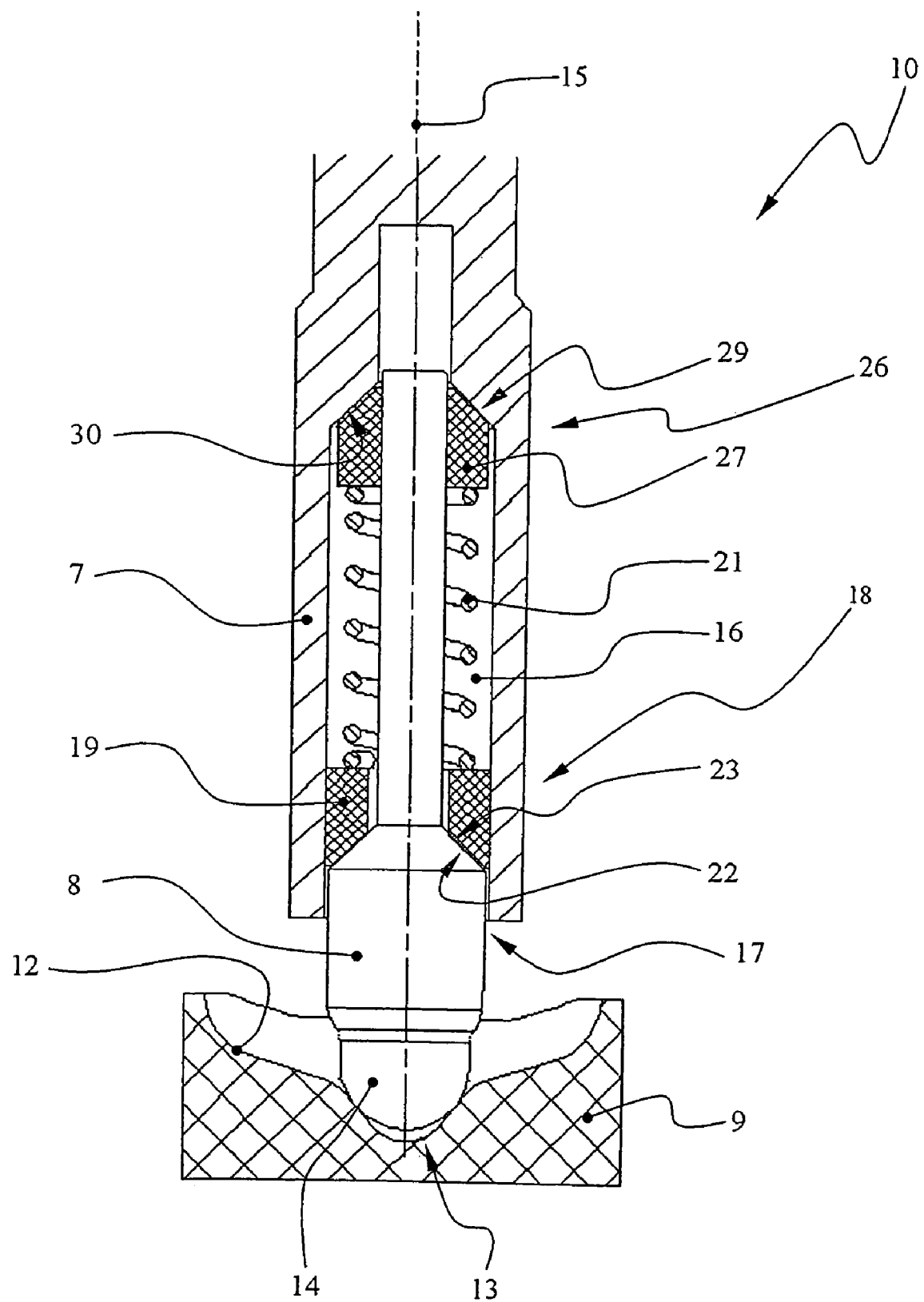
FIG. 5 is a sectional view of a detail of a second exemplary embodiment of the locking device according to the present invention.
Figure 6:
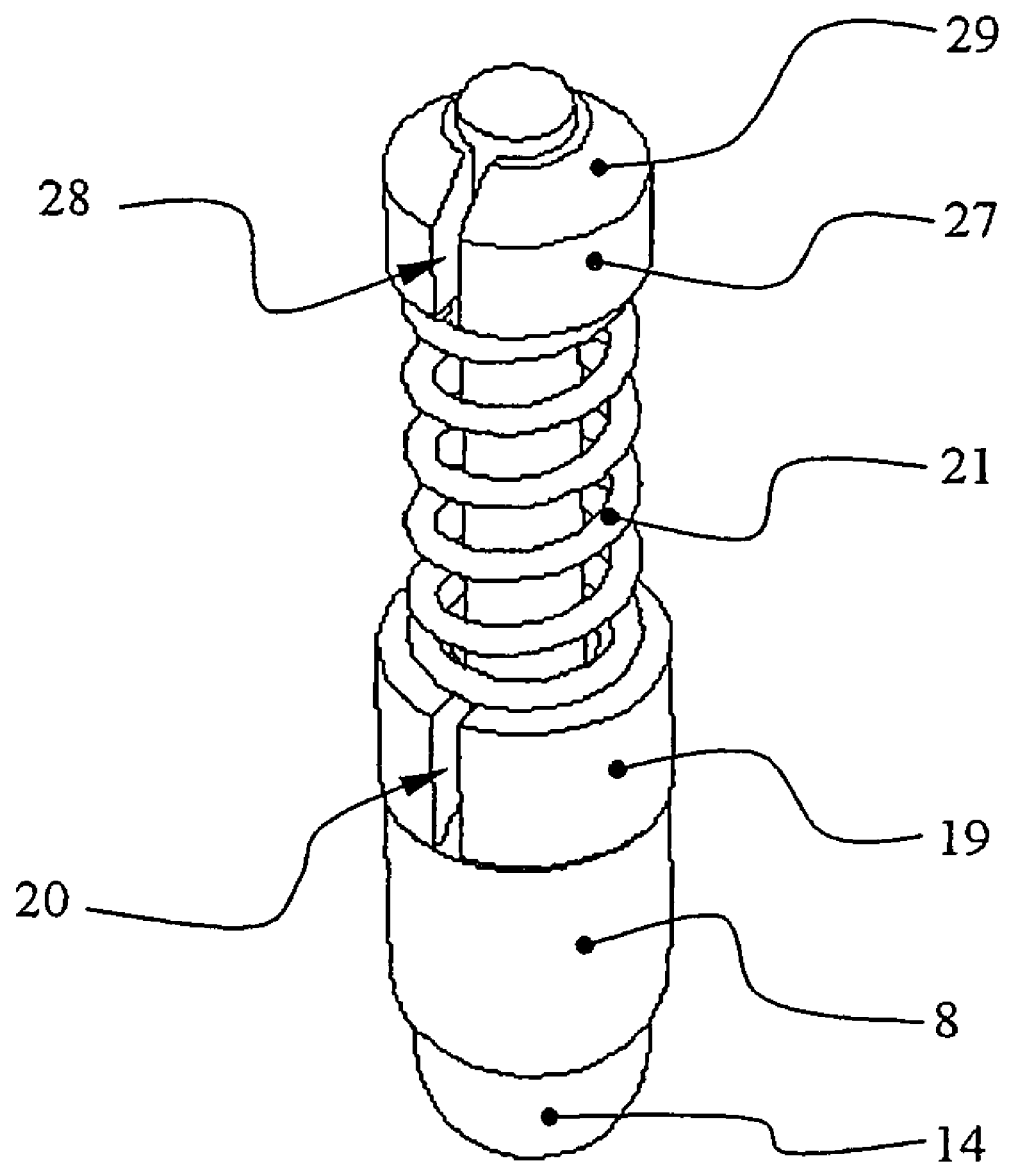
FIG. 6 is a three-dimensional view of a detail of the second exemplary embodiment according to FIG. 5 of the locking device according to the present invention.

FIGS. 5 and 6 show another embodiment of the locking device according to the present invention, in which a second centering device 26 is also provided next to a first centering 18, and the compression spring 21 is arranged between them. The first centering 18 corresponds to the above-described centering and is therefore not explained in greater detail here. An elastically deformable ring in the form of a slotted ring 27 with a continuous slot 28, which completely severs the ring 27, is likewise inserted between the pin 8 and the bracket 7 in the second centering device 26, which is arranged inside the recess 16. The compression spring 21 now acts directly between the slotted ring 19 of the front centering device 18 and the slotted ring 27 of the inner centering device 26. On the side facing way from the compression spring 21, the slotted ring 27 has a surface 29, which tapers into the interior of the recess and has a conical shape here. This conical surface 29 is in contact with a countersurface 30 of a likewise conical shape, which is located at the shoulder 24 of the bracket 7.

Due to the load of the compression spring 21 when the pin head 14 is in contact with the contact surface 12 of the contour 9, the slotted ring 27 is compressed in the direction of the longitudinal axis 15 of the recess 16 and it centers the pin 8 in relation to the central longitudinal axis 15 due to its contact with the pin 8. The provision of two centering devices offers the advantage that the clearance between the pin 8 and the bracket 7 is completely eliminated and the shift position, which is indicated by the locking of the pin head 14 in the depression 13, is mediated to the operator of the gearshift lever 3 exactly and without a vague feeling. The design is very compact and small and is characterized by a simple shape with a small number of standardized components in this case as well. In particular, there are no other elements that project from the bracket 7 and could compromise the path of motion of the bracket 7 or of the gearshift lever 3 connected to the bracket 7, besides the pin head 14, which projects from the bracket 7 by necessity.

Figure 7:
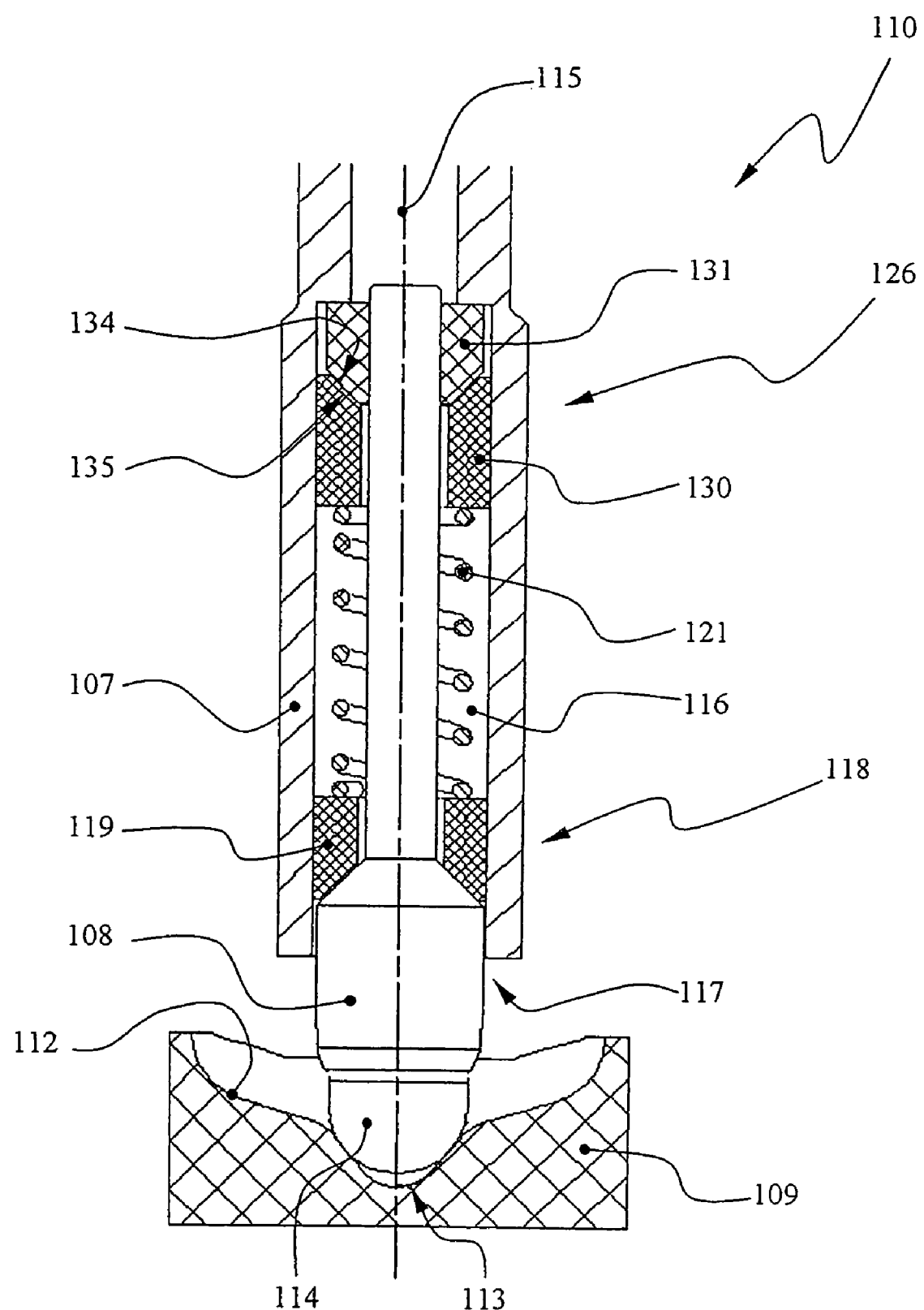
FIG. 7 is a sectional view of a detail of a third exemplary embodiment of the locking device according to the present invention.
Figure 8:
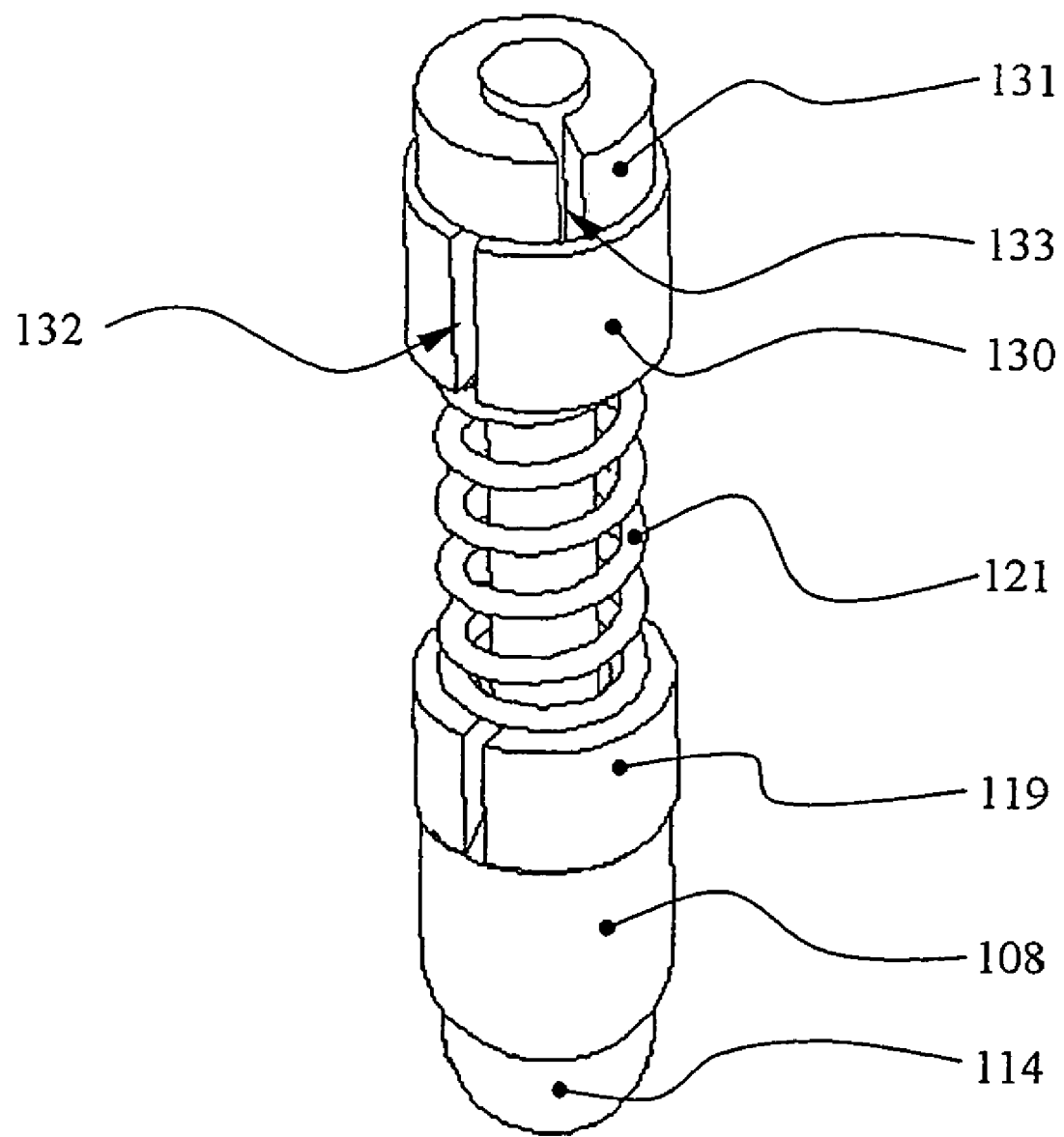
FIG. 8 is a three-dimensional view of a detail of the third exemplary embodiment according to FIG. 7 of the locking device according to the present invention.

Another advantageous embodiment of a locking device 110 with two centering devices 118 and 126 is shown in FIGS. 7 and 8. The design and the mode of operation of the centering device 118 corresponds to the above-described centering device 18 shown in FIGS. 3 through 6, so that only the elements of the first centering device 18 that are necessary for the explanation of the upper centering device 126 will be described here.

The second centering device 126, which is arranged inside the recess 116, has two elastically deformable rings, which are advantageously likewise designed as slotted rings 130 and 131 with slots 132, 133, between the pin 108 and the bracket 107. Both slotted rings 130, 131 have a surface 134, 135 each, which taper in the direction of the longitudinal axis 115, and these surfaces are advantageously likewise of a conical shape, and the two slotted rings 130, 131 are in contact with one another via the conical surfaces 134, 135. A first slotted ring 130 is in direct contact with the compression spring 121, and its conical surface 134 forms a countersink and is directed in the direction of the longitudinal axis 115. The second slotted ring 131 is in contact with the first slotted ring 130 by its conical surface 135, which forms a truncated cone, and is supported on the bracket 107 via a shoulder 124 on the side facing away from the conical surface 135.

When pressure is applied by the spring force of the compression spring 121, the two slotted rings 130, 131 slide against each other over their conical surfaces 134, 135. The first slotted ring 130 now expands and is supported on the inner wall of the recess 116, whereas the second slotted ring 131 is compressed and is in contact with the pin 108. As a result, a radially uniformly acting force, which centers the pin in relation to the longitudinal axis 115, is applied to the pin 108. This centering device 126 likewise has a rather compact design and is provided with a small number of components of a simple design. In cooperation with the first centering device 118, optimal centering action is likewise achieved here. The direction of the tapering surfaces 134 and 135 may also be transposed if needed. If the conical surface, designed as a truncated cone, is located at the first slotted ring 130, this ring is in contact with the pin 108, whereas the second slotted ring 131, which is provided with a conical surface in the form of a countersink in this case, would be in contact by its outer circumference with the bracket 107.

The use of two slotted rings 130, 131, as is shown in FIGS. 7 and 8, offers the additional advantage that the selection of the materials for the individual components can be extensively optimized and adapted to the individual requirement. For example, the second slotted ring 131 must make possible a sliding motion between the pin 108 and this slotted ring 131, which is not true of the first slotted ring to this extent.

As an alternative, the second centering device 126 may also be used as a single centering device. The compression spring 121 is supported now, for example, directly at a shoulder, not shown, on the pin 108.

In the embodiment shown in FIGS. 7 and 8, pressure is applied to the pin 108, as in the preceding embodiments, via a contact of the pin head 114 with the contact surface 112 of a stationary contour 109. The locking device is locked as soon as the pin head 114 is located in the depression 113 and is held in same by means of the compression spring 113. To adjust the gearshift lever 3, it will then be necessary to overcome the pressing force applied by the compression spring 121. As an alternative, the locking may also be provided at the pin head and elevations may be provided on the contour. The locked position would be given if the depression of the pin head came to lie on an elevation.

Besides the embodiment of the elastically deformable rings as slotted rings, which is shown in the figures, other embodiments of the elastically deformable rings are conceivable as well. Thus, the elastically deformable rings may also be designed as closed rings made of a soft material that undergoes the necessary deformations, especially a plastic.

The locking device described is not limited to use in a shifting device only, but it can also be used wherever the clearance of a locking pin is to be compensated, for example, also in steering column levers, such as turn signal levers and/or windshield wiper levers.

While specific embodiments of the invention have been shown and described in detail to illustrate the application of the principles of the invention, it will be understood that the invention may be embodied otherwise without departing from such principles.

The invention claimed is:

1. A locking device, comprising:
   an adjustable holder provided with a recess;
   a stationary contour with a contact surface;
   a pin arranged movably in said recess;
   a compression spring generating an axial spring force applied to said pin, said pin having a pin head, which projects from said recess of said holder and has a contact pair with said contact surface; and
   a centering device between said pin and said holder, said centering device having at least one elastically deformable ring, which is arranged between said pin and said holder within said recess, said elastically deformable ring being arranged displaceably within said recess, and said elastically deformable ring having a surface with a cross section tapering against the direction of the force of said compression spring, said surface of said elastically deformable ring being in contact with a complementary surface on said pin, wherein said ring is a slotted ring and said compression spring is in contact with said holder on the side facing away from said slotted ring.

2. A locking device in accordance with claim 1, wherein said, elastically deformable ring has at least one said slot, which is arranged axially or obliquely to a longitudinal axis of said pin and/or said recess and completely or partially severs said ring.

3. A locking device in accordance with claim 1, wherein said tapering surface of said elastically deformable ring has a conical shape.

4. A locking device in accordance with claim 1, wherein said contact surface has at least one depression.

5. A locking device, comprising:
   an adjustable holder having an inner surface defining a recess;
   a stationary contour with a contact surface;
   a pin arranged movably in said recess, said pin having a tapered pin surface;
   a compression spring generating an axial spring force applied to said pin, said pin having a pin head, said pin head extending from said recess of said holder, said pin head engaging said contact surface; and
   a centering device arranged between said pin and said holder, said centering device having at least one elastically deformable ring, said elastically deformable ring being arranged between said pin and said holder within said recess such that said elastically deformable ring displaceable within said recess, said elastically deformable ring having a tapered ring surface, said tapered ring surface of said elastically deformable ring being in contact with said tapered pin surface of said pin, said spring engaging said elastically deformable ring.

6. A locking device in accordance with claim 5, wherein said ring is a slotted ring and said compression spring is in contact with said holder on the side facing away from said slotted ring.

7. A locking device in accordance with claim 5, wherein said contact surface has at least one depression.

8. A locking device, comprising:
   an adjustable holder having an inner surface defining a recess;
   a stationary contour with a contact surface;
   a pin arranged movably in said recess, said pin having a tapered pin surface;
   a compression spring generating an axial spring force applied to said pin, said pin having a pin head, said pin head extending from said recess of said holder, said pin head engaging said contact surface; and
   a centering device arranged between said pin and said holder, said centering device having at least one elastically deformable ring, said elastically deformable ring being arranged between said pin and said holder within said recess such that said elastically deformable ring displaceable within said recess, said elastically deformable ring having a tapered ring surface and a radially extending surface, said tapered ring surface of said elastically deformable ring being in contact with said tapered pin surface of said pin, said spring engaging said radially extending surface of said elastically deformable ring and said holder.

9. A locking device in accordance with claim 8, wherein said ring is a slotted ring and said compression spring is in contact with said holder on the side facing away from said slotted ring.

10. A locking device in accordance with claim 8, wherein said contact surface has at least one depression.

* * * * *